(12) United States Patent
Goodman et al.

(10) Patent No.: US 12,726,519 B1
(45) Date of Patent: Sep. 1, 2026

(54) SYSTEMS AND METHODS FOR TRAFFIC SHAPING

(71) Applicant: Amazon Technologies, Inc., Seattle, WA (US)

(72) Inventors: Stephen Goodman, Owings Mills, MD (US); Daniel Allan Lundahl Dutrow, Ellicott City, MD (US); John Paul Schweitzer, White Springs, FL (US); Michael Lyle Artz, Columbia, MD (US); Patrick Collard, Arlington, VA (US); Ethan Joseph Torretta, Edmonds, WA (US); Thomas Bradley Scholl, Seattle, WA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 18/902,436

(22) Filed: Sep. 30, 2024

(51) Int. Cl.
*H04L 9/40* (2022.01)
*H04L 47/22* (2022.01)

(52) U.S. Cl.
CPC .......... *H04L 63/1491* (2013.01); *H04L 47/22* (2013.01); *H04L 63/1425* (2013.01)

(58) Field of Classification Search
CPC .. H04L 63/1491; H04L 47/22; H04L 63/1425
See application file for complete search history.

(56) References Cited

U.S. PATENT DOCUMENTS 7,181,769 B1 * 2/2007 Keanini .............. H04L 63/1416 726/25
8,615,785 B2 * 12/2013 Elrod .................. H04L 63/0227 713/192
8,683,588 B2 * 3/2014 Esteban .............. H04L 63/1416 726/22
8,726,384 B2 * 5/2014 Shi ...................... H04L 63/1416 713/153
8,732,296 B1 * 5/2014 Thomas .............. H04L 63/1441 709/239
8,892,766 B1 * 11/2014 Wei ......................... H04L 63/20 706/26
9,032,070 B1 * 5/2015 Stickle ................ H04L 63/1408 709/224
9,769,121 B2 * 9/2017 Joy ..................... H04L 63/1458
10,037,546 B1 * 7/2018 Benisch ............. G06Q 30/0246
10,084,806 B2 * 9/2018 Ward .................. H04L 63/1433
10,320,813 B1 * 6/2019 Ahmed ............... H04L 63/1416
10,341,355 B1 * 7/2019 Niemoller ............. H04L 63/104
10,873,601 B1 * 12/2020 Stickle ................ H04L 63/1416
10,972,470 B2 * 4/2021 Isola ................... H04L 63/0853
10,986,129 B1 * 4/2021 Sellers ................ H04L 63/1491
(Continued)

*Primary Examiner* — David Garcia Cervetti
(74) *Attorney, Agent, or Firm* — Nicholson DeVos Webster & Elliott LLP

(57) ABSTRACT

Techniques for traffic shaping are described. In some examples, an ingress point receives traffic from a source and determines to send the traffic to a traffic shaper instance. The shaper instance is capable of performing one or more of a plurality of actions, wherein the plurality of actions include altering a shape of the traffic prior to sending the traffic to an original destination of the traffic, re-directing the traffic to a honeypot, allowing the traffic without doing altering action, and blocking the traffic.

20 Claims, 14 Drawing Sheets

(56) References Cited

U.S. PATENT DOCUMENTS 11,032,319 B1* 6/2021 Roundy .................. G06F 21/62
11,038,920 B1* 6/2021 Sellers ................ H04L 63/1433
11,050,787 B1* 6/2021 Sharifi Mehr ...... G06F 9/45558
12,058,169 B1* 8/2024 Brandwine ......... H04L 63/1425
12,069,092 B2* 8/2024 Compton ............ H04L 63/1491
12,086,250 B1* 9/2024 Brandwine ........... G06F 21/566
2002/0032793 A1* 3/2002 Malan ................. H04L 63/1458 709/238
2006/0050719 A1* 3/2006 Barr ...................... H04L 45/586 370/469
2006/0095968 A1* 5/2006 Portolani ............ H04L 63/1416 370/245
2011/0072515 A1* 3/2011 Park .................... H04L 63/1458 709/224
2011/0205894 A1* 8/2011 Gunnalan ............... H04L 47/22 370/230.1
2012/0144487 A1* 6/2012 Kim .................... H04L 63/1416 726/23
2013/0235843 A1* 9/2013 Gohari .................. H04L 69/163 370/331
2013/0322255 A1* 12/2013 Dillon ................. H04L 41/5025 370/236
2015/0047047 A1* 2/2015 Amoroso ............ H04L 63/1433 726/25
2015/0067816 A1* 3/2015 Rados ..................... H04L 63/20 726/11
2015/0263935 A1* 9/2015 Burbridge ............... H04L 43/10 709/223
2016/0014033 A1* 1/2016 Dosovitsky ............. H04L 47/20 370/235
2016/0065447 A1* 3/2016 Khan ...................... H04L 45/22 370/237
2016/0218933 A1* 7/2016 Porras ................... H04L 41/147
2016/0219048 A1* 7/2016 Porras ................... H04L 41/147
2017/0223052 A1* 8/2017 Stutz ................... H04L 63/1491
2017/0339186 A1* 11/2017 Gurvich ............. H04L 61/5007
2018/0013787 A1* 1/2018 Jiang ........................ H04L 43/16
2018/0183830 A1* 6/2018 Wessels ............. H04L 63/1458
2019/0036926 A1* 1/2019 Isola ................... H04L 63/1425
2019/0068624 A1* 2/2019 Compton ............ H04L 63/1433
2019/0068642 A1* 2/2019 Araujo ................ H04L 63/1425
2019/0132358 A1* 5/2019 DiValentin .......... H04L 63/1416
2019/0158371 A1* 5/2019 Dillon ................... H04L 47/196
2019/0245887 A1* 8/2019 Vierra ................. H04L 63/1416
2020/0045069 A1* 2/2020 Nanda ................. H04L 63/1425
2020/0067980 A1* 2/2020 Livny ................. H04L 63/1408
2020/0382537 A1* 12/2020 Compton ............ H04L 63/1416
2020/0389487 A1* 12/2020 Zhauniarovich .... H04L 63/1491
2021/0006594 A1* 1/2021 Wang .................. H04L 63/0263
2021/0036993 A1* 2/2021 Pang ................... H04L 63/0263
2021/0067553 A1* 3/2021 Ries .................... H04L 63/1491
2021/0194925 A1* 6/2021 Xiao ................... H04L 63/0227
2021/0344690 A1* 11/2021 Sharifi Mehr ...... H04L 63/1416
2022/0038493 A1* 2/2022 Feldpusch ............. G06F 9/5027
2022/0070223 A1* 3/2022 Deng ....................... H04L 63/20
2022/0174090 A1* 6/2022 Gingold .............. H04L 43/0876
2023/0020154 A1* 1/2023 Nainar ................ H04L 47/2433
2024/0031392 A1* 1/2024 Ahn .................... H04L 63/0236
2024/0111871 A1* 4/2024 Hoogenboom ....... G06F 21/566
2024/0179124 A1* 5/2024 Kommula ........... H04L 63/0236
2024/0236148 A1* 7/2024 Bellekens ........... H04L 63/1491
2024/0333758 A1* 10/2024 Bernath .............. H04L 63/1458
2024/0338474 A1* 10/2024 Shelly .................. G06Q 10/103
2024/0372880 A1* 11/2024 Bansal ................ H04L 63/1416
2024/0406173 A1* 12/2024 Acosta ................ H04L 63/1491
2024/0414128 A1* 12/2024 Ahn .................... H04L 63/0263
2025/0310362 A1* 10/2025 Duan .................. H04L 63/0236
2025/0358312 A1* 11/2025 Gibson ............... H04L 63/1483

* cited by examiner

SYSTEMS AND METHODS FOR TRAFFIC SHAPING

BACKGROUND

Cloud computing provides a simple way to access servers, storage, databases and a broad set of application services over the internet. A cloud provider network owns and maintains the network-connected hardware required for these application services, while users provision and use what they need.

BRIEF DESCRIPTION OF DRAWINGS

Various examples in accordance with the present disclosure will be described with reference to the drawings, in which.

DETAILED DESCRIPTION

The present disclosure relates to methods, apparatus, systems, and non-transitory computer-readable storage media for traffic shaping and/or redirection.

Some users of cloud provider networks have their resources relentlessly probe, etc. by attackers. Maintaining an effective security perimeter (e.g., using firewalls, blocking particular source internet protocol (IP) addresses, etc.) for all of a cloud computing provider network is an ongoing and difficult task, particularly while continuing operations. Individual users may protect their resources independently (often with help from cloud provider networks) against attacks. For example, some users may be subjected to distributed denial of service (DDOS) attacks, but have architectures that are resilient to that, so they ignore the attacks. The instance-neighbors of those customers however end up harmed collaterally due to the noisy neighbor problem.

Examples detailed herein describe the usage of cloud provider network service telemetry and threat intelligence to identify and safely intercept incoming threats. In particular, active traffic shaping and redirection is used to safely intercept and handle incoming threats-instead of simply blocking, these attacks may be intercepted, interrogated, redirected, and/or slowed. This enables the gathering of additional threat intelligence to inform investigations and refine existing capabilities. Note that traffic can be redirected to existing honeypots. No matter the response, traffic can be safely redirected around user workloads, while contributing to threat intel gathering efforts.

In some examples, the cloud provider network includes a service to actively control network performance and modify traffic characteristics for in-line mitigation of identified security threats. This service intercepts scanner traffic and tailor responses to frustrate intrusion and exploit attempts, reduce accuracy of scan data, or redirect malicious actors to honeypots. For example, bad actor "frequent flyers'" traffic is redirected in an always-on configuration that allows traffic shaping before an attack can cause noisy neighbor harm. Note that in some examples, the service is not customer visible or accessible.

Figure 1:
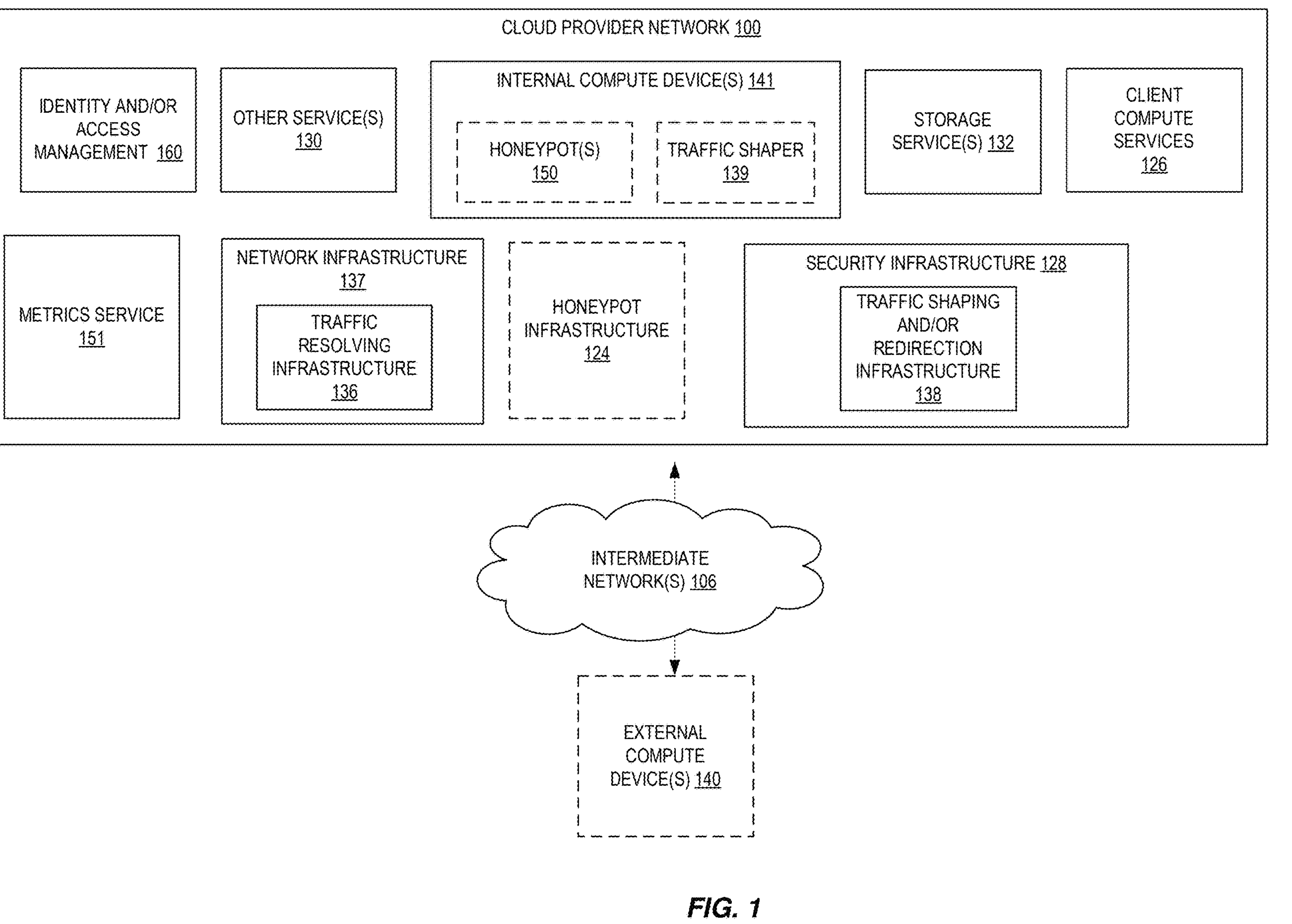
FIG. 1 illustrates examples of one or more systems to perform traffic shaping and/or redirect based, at least in part, on analyzed traffic.

FIG. 1 illustrates examples of one or more systems to perform traffic shaping and/or redirect based, at least in part, on analyzed traffic. In this illustration a cloud provider network 100 is shown with a plurality of services. For example, one or more client compute service(s) 126 may include compute hardware (such as processors, accelerators, etc.), compute storage, and networking components. The client computer service(s) 126 may utilize virtualized resources and/or bare metal resources. The client computer service(s) 126 allows for the support for one or more other services 130 in some examples. Examples of services include, but are not limited to: storage services, database services, machine learning services, analytics services, content delivery services, virtualized compute services, security services, etc. For example, the client computer service(s) 126 may be configured to run a web service, act as a data store, serve a website, etc. using one or more of the other services (e.g., storage service(s) 132 which are used to store data, other service(s) 130, etc.) of the provider network 100.

A security infrastructure 128 provides security functionality for the cloud provider network 100. For example, the security infrastructure 128 may be used to implement threat mitigations to protect the services of the cloud provider network 100. For example, the security infrastructure 128 may be used to protect client compute services from known bad actors associated with a particular IP address. The security infrastructure 128 may include services such as a web application firewall to filter malicious web traffic, a threat detection service, a central firewall (e.g., for all of the provider network and/or all of a user's client compute, a network firewall, denial of service protection, etc.). Other examples of threat mitigation are detailed below.

The security infrastructure 128 (that may include one or more security detection services) may be used to detect potentially undesirable behavior in the cloud provider network 100 such as potentially undesirable connections and/or accesses to the client compute service(s) 126, storage service (s) 132, etc. The security infrastructure 128 may utilize the identify and/or access management service 160, the storage service(s) 132, and/or the metrics service 151 in detecting behaviors. Detected behaviors may cause the security infrastructure 128 to implement one or more security policies such as threat mitigations or may cause a user to cause the security infrastructure 128 to implement one or more security policies such as threat mitigations.

The security infrastructure 128 includes traffic shaping and/or redirection infrastructure 138 (which may be considered a service) that may perform traffic shaping and/or redirection. What activity is to be performed may be dependent on the source, destination, previous shaping or redirection operations, the port(s) used, the protocol used, etc.

Traffic resolving infrastructure 136 (a part of networking infrastructure 137 for the cloud provider network 100) performs address resolving. For example, the traffic resolving infrastructure 136 performs network address translation from the public internet to/from internal cloud provider network resources, or from internal cloud provider network resources to other internal cloud provider network resources, etc. The traffic resolving infrastructure 136 also makes an initial determination of if traffic is to be shaped or redirected.

In some examples, a honeypot infrastructure 124 supports honeypots that consist of exposed sensors that are accessible via the internet and are configured to handle connection attempts from devices (e.g., external compute device(s) 140 or internal computer device(s) 141 (for example, devices that are internal to the cloud provider network 100 (note these "devices" may be virtual and be running on client compute service(s) 126))) that are both known and unknown and on a variety of network protocols and ports. The sensors are programmed to mimic real application behaviors that would be made available on client compute service(s) 126 to extract data about the client, the interaction itself, and the intent of the interaction. As such, the honeypots are intentionally vulnerable to interactions and exploitation by attackers. The honeypot infrastructure 124 aggregates the data from these interactions and publishes the output for consumption as threat intelligence. Internal compute devices 141 provide honeypot(s) 150 (as configured using the honeypot infrastructure 124) and/or traffic shapers 139 that are configured by the traffic shaping and/or redirection infrastructure 138. Note that the infrastructure(s) may be services in some examples.

In some examples, an identity and/or access management service 160 control accesses to resources (e.g., storage, client compute, etc.). In some examples, a metrics service 151 tracks access to resources, telemetry information, metadata for traffic (note this may be considered telemetry information in some examples), etc.

The cloud provider network 100 (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure; for example, virtual machine instances may be concurrently hosted for different customers using a same underlying physical host computing device.

Users can interact with a cloud provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM can be provided one or more IP addresses in the overlay network, and the VMM on a host can be aware of the IP addresses of the virtual machines on the host. The VMMs (and/or other devices or processes on the network substrate) can use encapsulation protocol technology to encapsulate and route network packets (e.g., client IP packets) over the network substrate between virtualized resources on different hosts within the cloud provider network. The encapsulation protocol technology can be used on the network substrate to route encapsulated packets between endpoints on the network substrate via overlay network paths or routes. The encapsulation protocol technology can be viewed as providing a virtual network topology overlaid on the network substrate. The encapsulation protocol technology can include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A virtual private cloud (VPC) (also referred to as a virtual network (VNet), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the availability zones in a particular region.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

Figure 2:
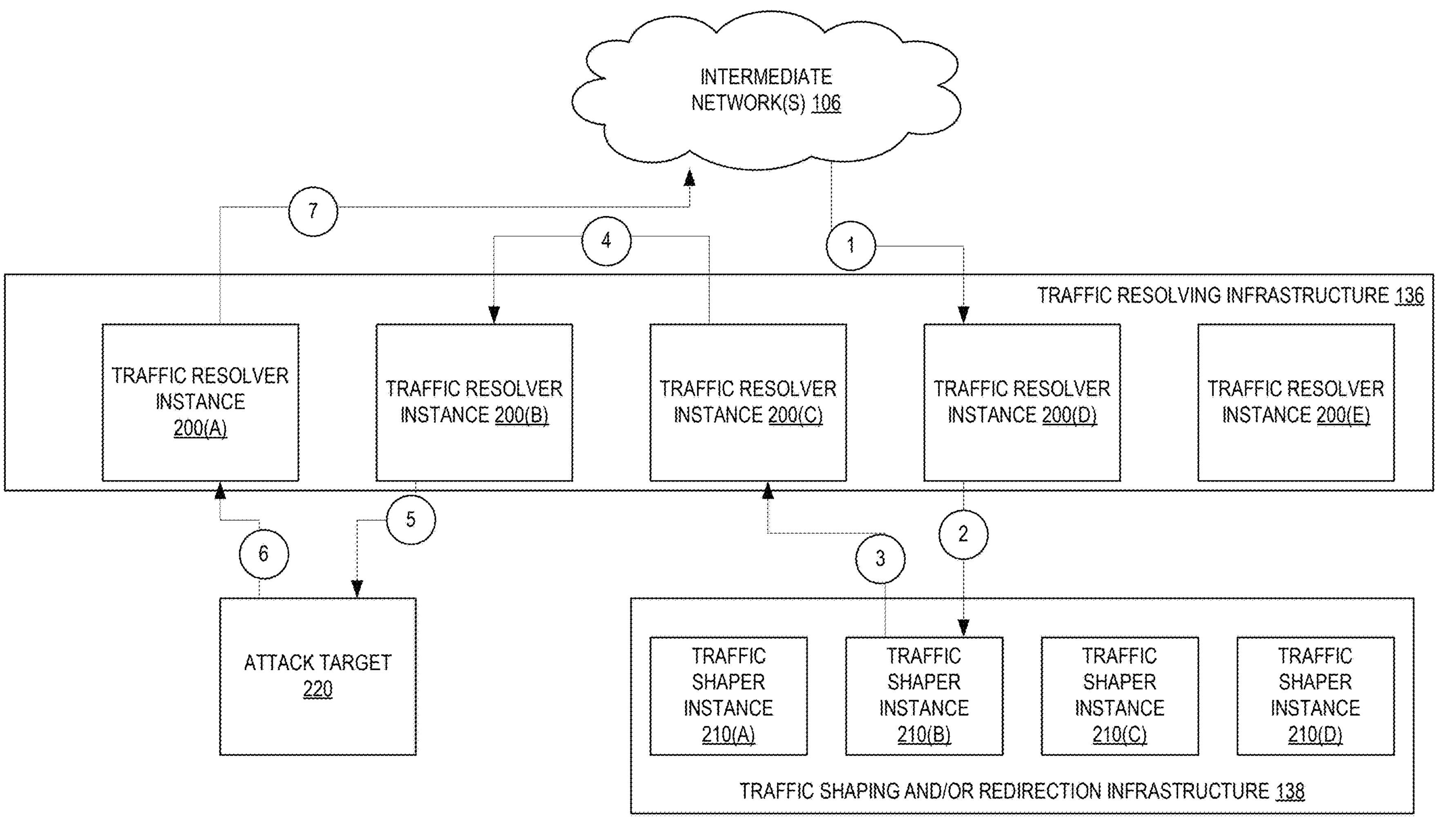
FIG. 2 illustrates examples of usage of a traffic shaping and/or redirection infrastructure.

FIG. 2 illustrates examples of usage of a traffic shaping and/or redirection infrastructure. For example, usage of traffic resolving infrastructure 138. In this illustration, traffic is received from an intermediate network 106 (in particular, the internet). The traffic (e.g., one or more packets) is received by a first traffic resolver instance 200(D) of a plurality of traffic resolver instances 200(A)-(E) at circle 1. The traffic arrives from a particular source IP from a particular port, is to go to a particular destination IP at a particular port, and uses a particular protocol. For example, traffic may arrive from source IP 8.8.4.4 and be destined for IP 53.1.2.3. This tuple of packet metadata may be captured by the first traffic resolver instance 200(D).

The first traffic resolver instance 200(D) determines from the tuple of packet metadata and additional context (telemetry data) if the traffic should be passed to the attack target 220 (meaning the traffic is unlikely to be malicious) or if the traffic should first go to a traffic shaper instance of the traffic shaping and/or redirection infrastructure 138. Traffic resolver instances 200 make this decision based on analytics in some examples. Examples of telemetry data that may be used include, but are not limited to: a single source IP that addresses a single port at many, different IP destination addresses (in some examples, the port and number of IP addresses which align with undesirable behavior are configurable), a single source IP that addresses many ports at a limited number of IP destination addresses (in some examples, the ports and number of IP addresses which align with undesirable behavior are configurable), a single source IP that addresses many, different IP destination addresses (in some examples, the number of IP addresses which align with undesirable behavior are configurable), a group of source IPs that are nearby (e.g., within the same block) that address many, different IP destination addresses (in some examples, the group size and number of IP addresses which align with undesirable behavior are configurable), the number of cloud provider accounts a particular source IP address is attempting to connect to over a period of time, a number of instances a particular source IP address is attempting to connect to over a period of time, a number of source IP address attempting to connect to a particular destination IP address, account, or instances over a period of time, etc.

In some examples, an enricher provides additional context (e.g., additional telemetry information) to and/or scores for interactions to enrich the analysis. Examples of additional context may include total honeypot connections (e.g., over a set time period), a count of events for a particular IP and account, a count of account identifiers, a count of authorized requests, a count of unauthorized requests, a count of all requests, a count of unique accounts, a count of total connections on a set of ports with unsuccessful connections (e.g., a TCP handshake was not made), a count of total connections on a set of ports with successful connections (e.g., a TCP handshake not made), an average count of connections on a set of ports with unsuccessful connections (e.g., a TCP handshake was not made), an average count of connections on a set of ports with successful connections (e.g., a TCP handshake not made), an average count of connections, a ratio of unsuccessful connections to total connections, an indication of scanning of IPs is being performed, a count of connections back to an external or remote IP address, a count of bytes back to an external or remote IP address, a ratio of the total connections back to an external or remote IP address and the count of bytes back to that address, an indication of the outbound connection or data exceeds a threshold, an indication of if an IP address is a VPN address, an indication of if an IP address is a TOR exit node, an indication of if an IP address is a proxy, an autonomous system number (ASN) for an IP address, ownership information for an ASN, a CIDR notation for an ASN, an IP version data, etc.

In some examples, the traffic resolver instances 200 have additional information regarding specifics of what should be allowed. For example, if traffic implicitly looks like it is intended for a particular customer legitimately it may be allowed regardless of the above. For example, if there is a recent authentication for a source IP address to a particular destination then that traffic should be allowed, or traffic from an internal cloud provider network service (e.g., not associated with a particular account) should be allowed, or traffic from the same virtual private network (VPN) should be allowed. The additional information should be pushed to the traffic resolver instances 200. The traffic resolving infrastructure 136 may track this type of information, or be provided this information may a monitoring service, etc.

In this illustration, the traffic is determined to need traffic shaping and/or re-direction. For example, the first traffic resolver instance 200(D) may resolve the addressing such that the new destination is a particular shaper 210(B) at circle 2. The packet that leaves the first traffic resolver instance 200(D) includes the source IP of the first traffic resolver instance 200(D), the destination IP address of the shaper 210(B), and also includes the original IP address information (and port and protocol).

The shaper 210(B) may perform one or more actions. Examples of potential actions include, but are not limited to 1) performing throttling/tarpitting to selectively dropping some amount of individual packets along the path to the destination and/or actively modifying the maximum transmission unit (MTU) value of the packet(s) to be very small (e.g., in the 10 s); 2) selectively dropping return acknowledgements (ACKs)/selective ACKS (SACKs) of transmission control protocol packets; 3) using a variable maximum segment size (MSS); 4) performing transmission control protocol (TCP) sniping by faking reset (RST) packets back to the origin to make the port look not-open or to shut down in-progress connections; 5) performing packet capture (PCAP) of the header only; 6) collection (header only, if needed) invalid TCP checksums, randomly; 7) sending invalid TCP checksums at random times; 8) sending invalid fragments or fragment offsets with the don't fragment (DF) bit set in the TCP header; 9) invalidating a payload (e.g., injecting random data in the payload (but with a valid checksum)) of a sampling of individual packets from the streams; 10) manipulating TCP header information (e.g., sequence numbers, window sizes, checksum, explicit congestion notification (ECN), ECN (TCP peer is ECN-capable), etc.) that is not the source IP, destination IP, or ports; and/or 11) re-direction (e.g., to a honeypot). Note that some of these, such as the RST packet sending, are not forwarded to the original destination, but are "spoofed" from the original destination to the source.

After the shaper 210(B) has performed the one or more actions, in some examples it goes back to a traffic resolver instance 200 (e.g., traffic resolver instance 200(C)) at circle 3. In some examples, the shaper 210(B) more directly interacts with the attack target 220. In this illustration, the shaper 210(B) goes back to the traffic resolver instances. The output of shaper 210(B) is the modified packet that also includes updated routing information (e.g., its IP address as the source, the destination IP address as traffic resolver instance 200(C)) and includes the original tuple information.

The traffic resolver instance 200(C) ensures that the shaper handled the traffic and routes to another traffic resolver instance 200(B) at circle 4 to have it resolve the address of the target 220 and that traffic resolver instance 200(B) routes the shaped packed to the attack target 220 at circle 5 which responds back to the original sender through traffic resolver instance 200(A) (circles 6 and 7).

Note that in some examples, the shaper 210 and traffic resolver instances 200 only operate at the network infrastructure layer and do not inspect or analyze any data payloads. They only inspect connection metadata like IP addresses, ports, protocols etc. to identify and control suspected malicious traffic flows before they reach customer environments. All customer data remains fully encrypted in transit without cloud provider network visibility. Also, other security services may be used such as a web application firewall (WAF) to secure application traffic, a network firewall to provide traffic inspection within VPCs, etc.

Figure 3:
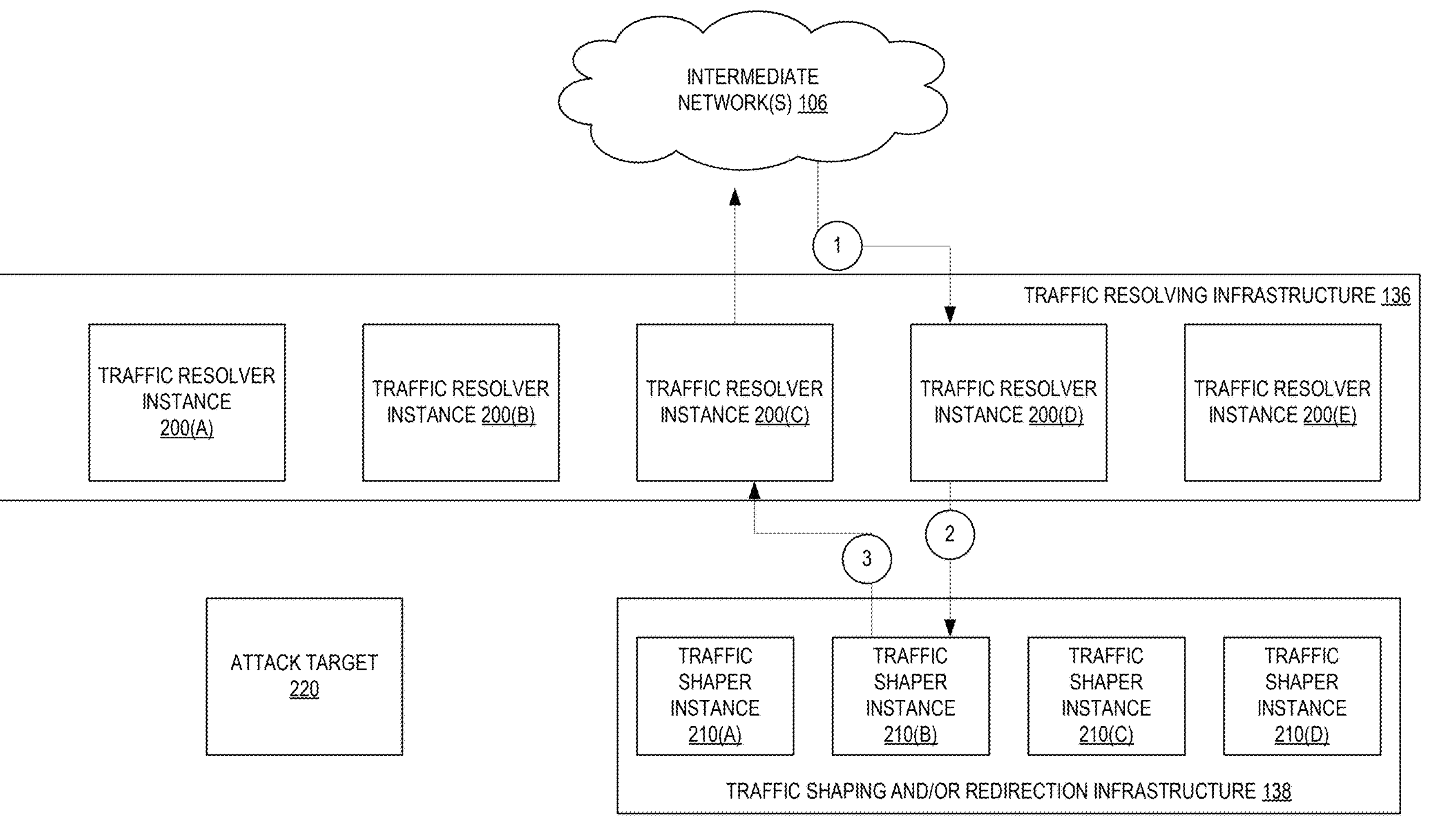
FIG. 3 illustrates examples of usage of a traffic shaping and/or redirection infrastructure.

FIG. 3 illustrates examples of usage of a traffic shaping and/or redirection infrastructure. In this example, circles 1 and 2 are the same as before and the traffic shaper instance 210(B) responds directly to the sender at circle 3.

Figure 4:
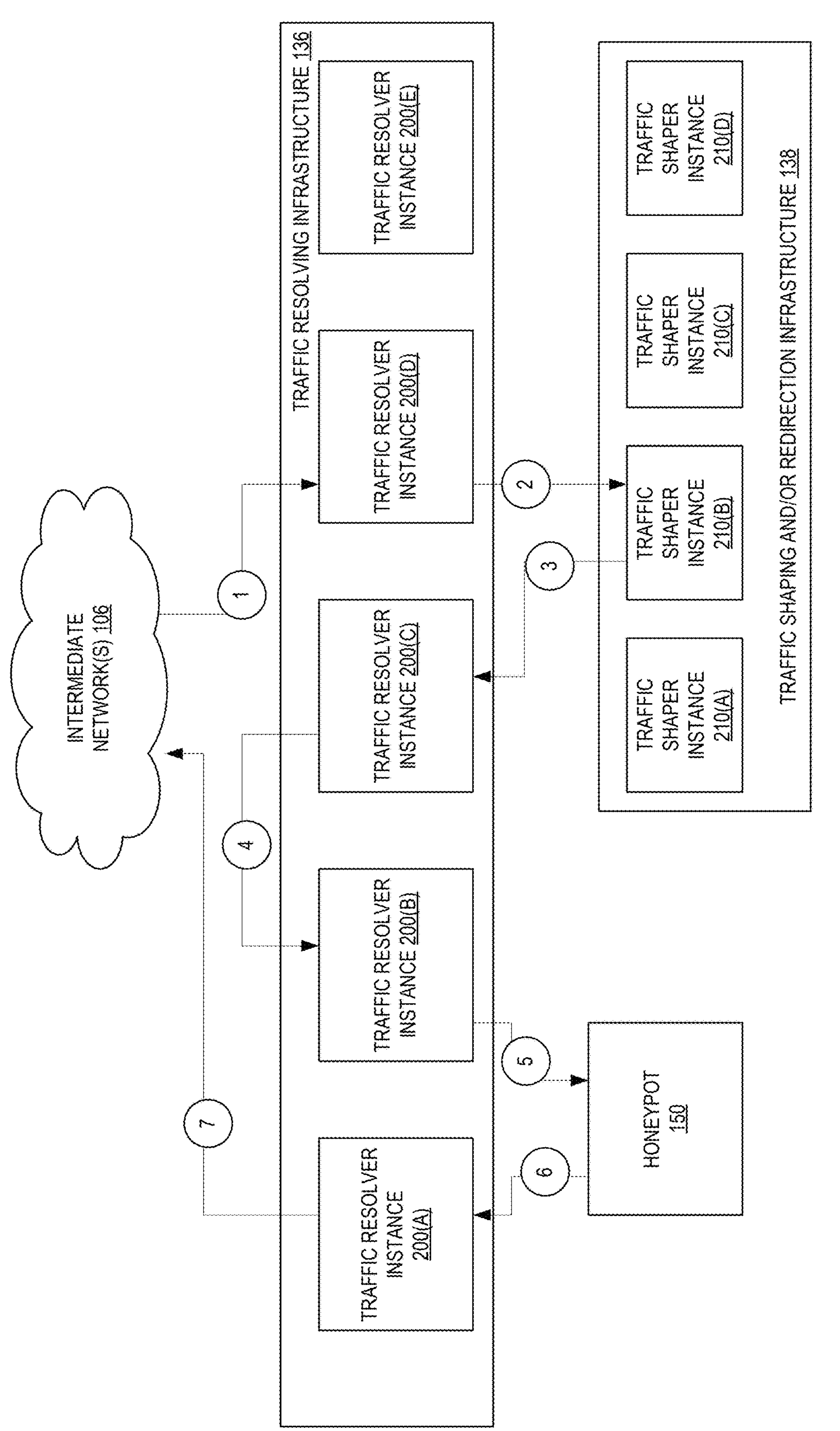
FIG. 4 illustrates examples of usage of a traffic shaping and/or redirection infrastructure.

FIG. 4 illustrates examples of usage of a traffic shaping and/or redirection infrastructure. In this example, circles 1 and 2 are the same as before and the traffic shaper instance 210(B) determines that the traffic should go to a honeypot 150. Circles 4 and 5 are the same as before (except for the destination IP) and the honeypot 150 responds back to the sender at circles 6 and 7.

Figure 5:
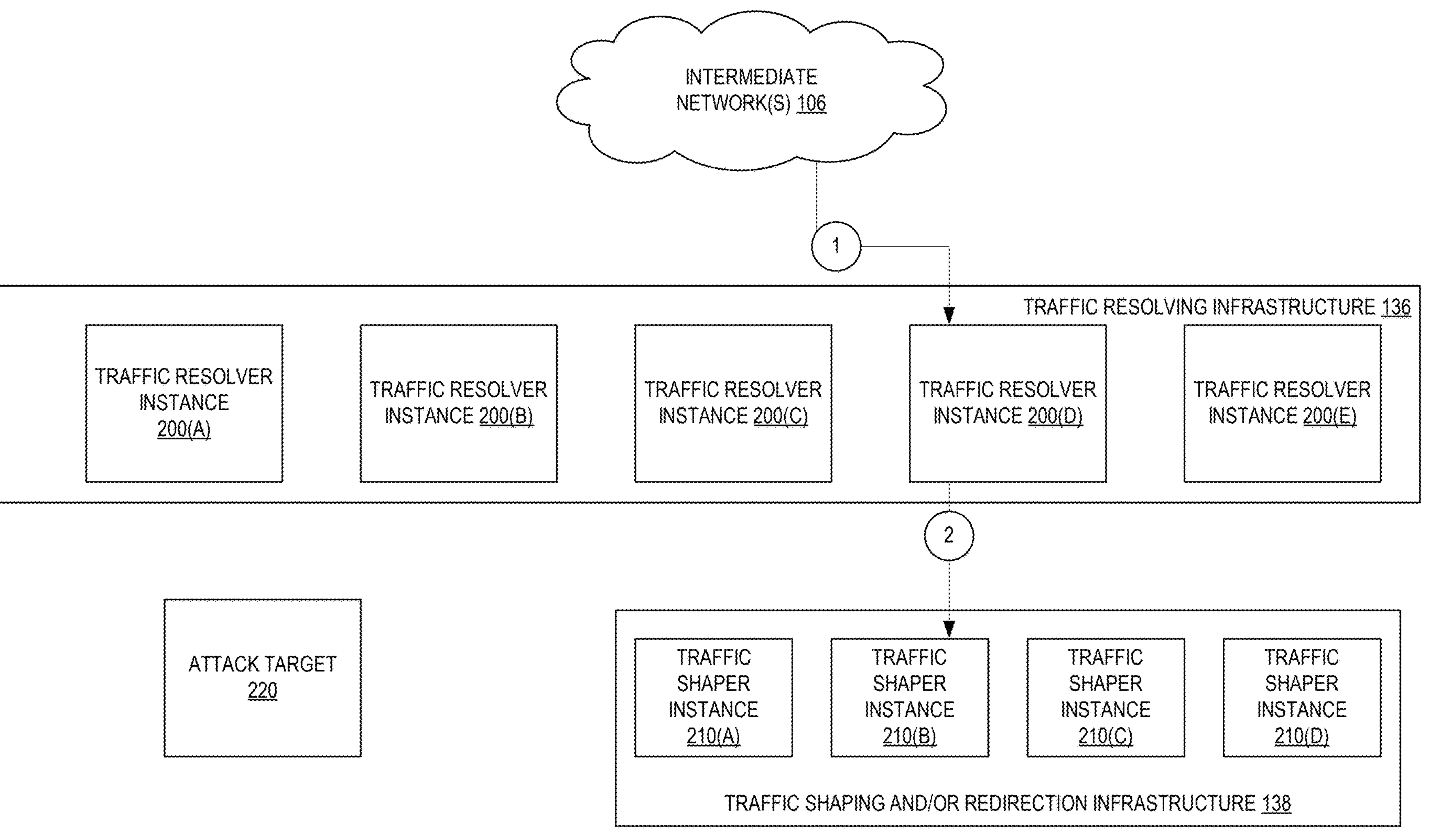
FIG. 5 illustrates examples of usage of a traffic shaping and/or redirection infrastructure.

FIG. 5 illustrates examples of usage of a traffic shaping and/or redirection infrastructure. In this example, circles 1 and 2 are the same as before and the traffic shaper instance 210(B) just drops the packet.

Figure 6:
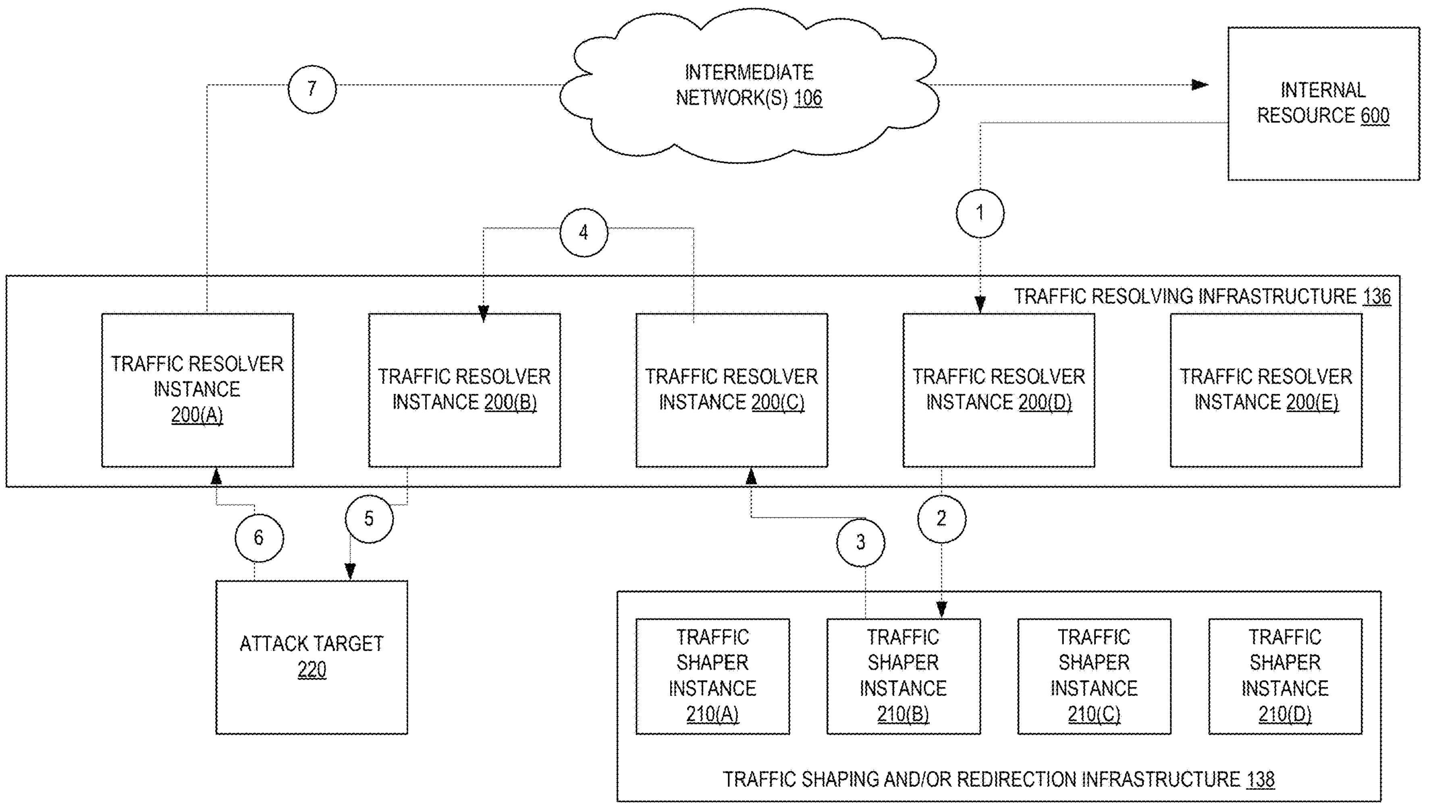
FIG. 6 illustrates examples of usage of a traffic shaping and/or redirection infrastructure.

FIG. 6 illustrates examples of usage of a traffic shaping and/or redirection infrastructure. In this example, an internal compute instance 600 of the provider network is the source. The response at circle 7 is to that internal compute instance 600.

Figure 7:
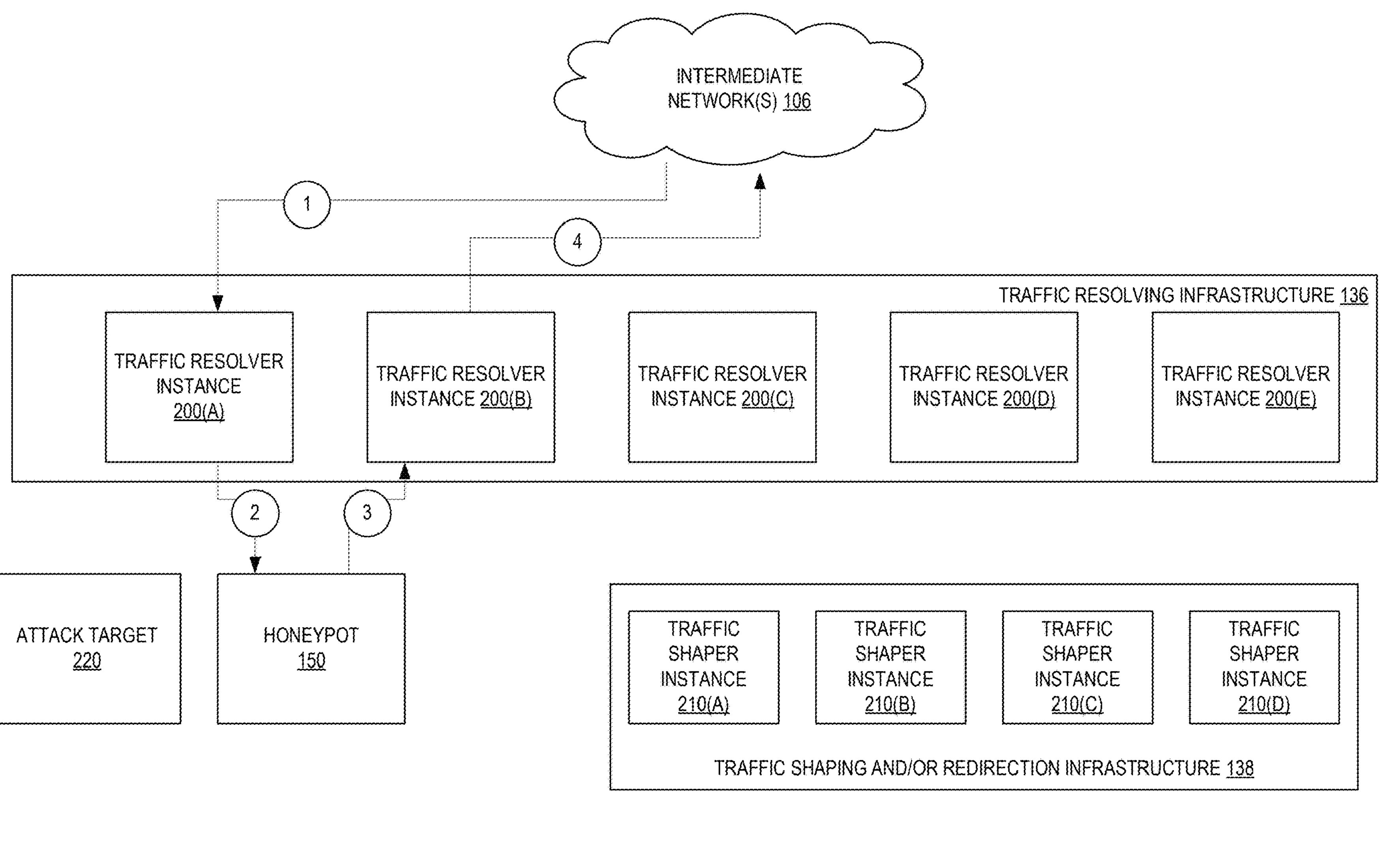
FIG. 7 illustrates examples of usage of a traffic shaping and/or redirection infrastructure.

FIG. 7 illustrates examples of usage of a traffic shaping and/or redirection infrastructure. In this example, the traffic resolver instance 200(A) receives traffic at circle 1 and resolves to a honeypot 150 at circle 2. The honeypot 150 returns traffic to the sender (circles 3 and 4).

Figure 8:
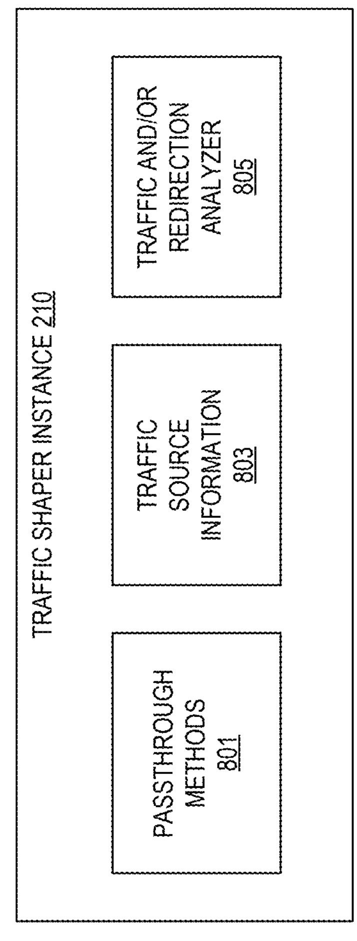
FIG. 8 illustrates examples of a traffic shaper instance.

FIG. 8 illustrates examples of a traffic shaper instance. The traffic shaper instance 210 stores, or has access to, information about sources of traffic 803. This information may include information such as which passthrough action (of passthrough actions 801) to perform for a given source. Examples of passthrough actions may include, but are not limited to 1) performing throttling/tarpitting to selectively dropping some amount of individual packets along the path to the destination and/or actively modifying the maximum transmission unit (MTU) value of the packet(s) to be very small (e.g., in the 10 s); 2) selectively dropping return acknowledgements (ACKs)/selective ACKS (SACKs); 3) using a variable maximum segment size (MSS); 4) performing transmission control protocol (TCP) sniping by faking reset (RST) packets back to the origin to make the port look not-open or to shut down in-progress connections; 5) performing packet capture (PCAP) of the header only; 6) collection (header only, if needed) invalid TCP checksums, randomly; 7) sending invalid TCP checksums at random times; 8) sending invalid fragments or fragment offsets with the don't fragment (DF) bit set in the TCP header; 9) injecting random data in the payload (but with a valid checksum) of a sampling of individual packets from the streams; 10) manipulating TCP header information (e.g., sequence numbers, window sizes, checksum, explicit congestion notification (ECN), ECN (TCP peer is ECN-capable), etc.) that is not the source IP, destination IP, or ports; and/or 11) re-direction. Note that some of these, such as the RST packet sending, are not forwarded to the original destination, but are "spoofed" from the original destination to the source. The information about sources of traffic 803 may come from the traffic resolving infrastructure 136 and/or other services.

In some examples, a traffic shaper instance 210 includes a traffic and/or redirection analyzer 805 which chooses which of the action to take based on, for example, historical traffic and/or previous actions (for example, if TCP sniping has been used before invalid fragments may be used at a later point). In some examples, the source information 803 explicitly dictates the action to take.

Figure 9:
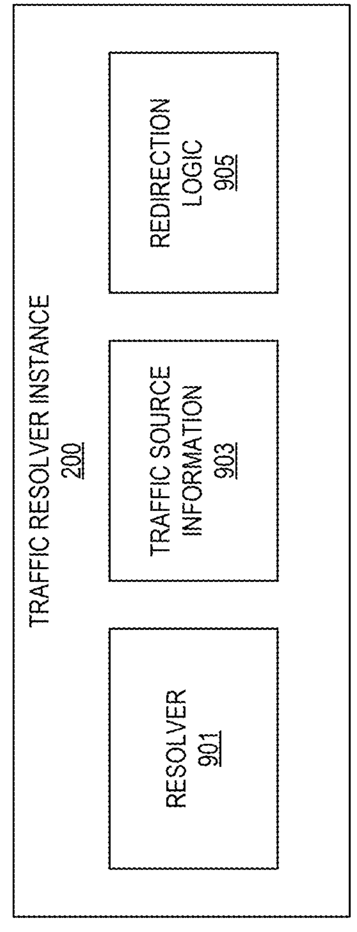
FIG. 9 illustrates examples of a traffic resolver instance.

FIG. 9 illustrates examples of a traffic resolver instance. The traffic resolver instance 200 includes resolver logic 901 to resolve addresses. The traffic resolver instance 200 also includes redirection logic 905 to determine when to redirect traffic (and cause the resolve logic 901 to change the destination, etc.) based on information about sources of traffic 903. Note that the redirection logic 905 may be the entity that redirects to a honeypot, etc. and not a traffic shaper instance 210.

The information 903 may include telemetry data that may include, but are not limited to: a single source IP that addresses a single port at many, different IP destination addresses (in some examples, the port and number of IP addresses which align with undesirable behavior are configurable), a single source IP that addresses many ports at a limited number of IP destination addresses (in some examples, the ports and number of IP addresses which align with undesirable behavior are configurable), a single source IP that addresses many, different IP destination addresses (in some examples, the number of IP addresses which align with undesirable behavior are configurable), a group of source IPs that are nearby (e.g., within the same block) that address many, different IP destination addresses (in some examples, the group size and number of IP addresses which align with undesirable behavior are configurable), the number of cloud provider accounts a particular source IP address is attempting to connect to over a period of time, a number of instances a particular source IP address is attempting to connect to over a period of time, a number of source IP address attempting to connect to a particular destination IP address, account, or instances over a period of time, etc.

In some examples, an enricher (which may be a part of a traffic resolver instance 200 or external to it) provides additional context (e.g., additional telemetry information) to and/or scores for interactions to enrich the analysis. Examples of additional context may include total honeypot connections (e.g., over a set time period), a count of events for a particular IP and account, a count of account identifiers, a count of authorized requests, a count of unauthorized requests, a count of all requests, a count of unique accounts, a count of total connections on a set of ports with unsuccessful connections (e.g., a TCP handshake was not made), a count of total connections on a set of ports with successful connections (e.g., a TCP handshake not made), an average count of connections on a set of ports with unsuccessful connections (e.g., a TCP handshake was not made), an average count of connections on a set of ports with successful connections (e.g., a TCP handshake not made), an average count of connections, a ratio of unsuccessful connections to total connections, an indication of scanning of IPs is being performed, a count of connections back to an external or remote IP address, a count of bytes back to an external or remote IP address, a ratio of the total connections back to an external or remote IP address and the count of bytes back to that address, an indication of the outbound connection or data exceeds a threshold, an indication of if an IP address is a VPN address, an indication of if an IP address is a TOR exit node, an indication of if an IP address is a proxy, an autonomous system number (ASN) for an IP address, ownership information for an ASN, a CIDR notation for an ASN, an IP version data, etc.

In some examples, the traffic resolver instances 200 have additional information regarding specifics of what should be allowed. For example, if traffic implicitly looks like it is intended for a particular customer legitimately it may be allowed regardless of the above. For example, if there is a recent authentication for a source IP address to a particular destination then that traffic should be allowed, or traffic from an internal cloud provider network service (e.g., not associated with a particular account) should be allowed, or traffic from the same virtual private network (VPN) should be allowed. The additional information should be pushed to the traffic resolver instances 200. The traffic resolving infrastructure 136 may track this type of information, or be provided this information may a monitoring service, etc.

Figure 10:
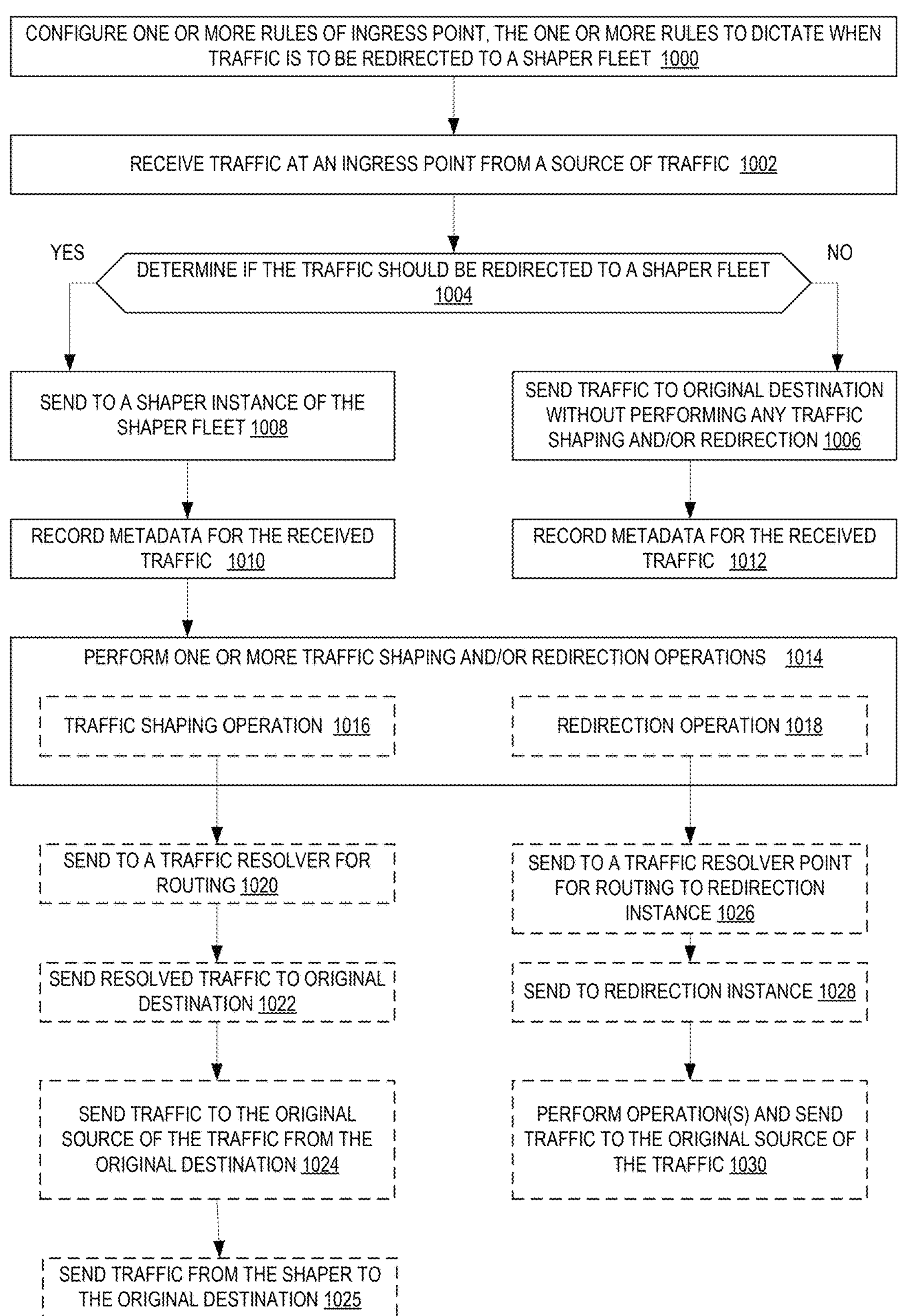
FIG. 10 is a flow diagram illustrating operations of a method for potentially shaping and/or redirecting traffic according to some examples.

FIG. 10 is a flow diagram illustrating operations of a method for potentially shaping and/or redirecting traffic according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the security infrastructure 128 and/or traffic resolving infrastructure 136 of the other figures.

Configuring one or more rules and/or information about sources at ingress point, the one or more rules to dictate when traffic is to be redirected to a shaper fleet at 1000. In some examples, the one or more rules are embodied in redirection logic 905. The application of the one or more rules may utilize source information such as the telemetry data detailed above. In some examples, the rules and/or information about sources are configured periodically. In some examples, the rules and/or information about sources are configured on an ad hoc basis. In some examples, the information about sources is sent from a metrics service 151 which tracks telemetry data.

Traffic is received at the ingress point from a source of traffic at 1002. The source may be external to a cloud provider network (and the traffic received via the internet) or the source may be a resource internal to the cloud provider network (such as a client compute resource).

The ingress point determines if the traffic should be redirected to a shaper fleet at 1004. This determination is based on one or more of the 5-tuple metadata associated with the traffic (IP addresses, ports, and protocol) and the information about sources that is available to the ingress point. In some examples, redirection logic 905 makes this determination.

The traffic is sent to the original destination without performing any traffic shaping and/or redirection at 1006 when the determination is that there should be no shaper fleet redirection. In some examples, metadata for the received traffic is recorded at 1012. Other information may also be recorded such as when the traffic was received. In some examples, the recorded information is sent to a metrics service 151 which tracks telemetry data.

When the determination is that there should be a shaper fleet redirection, the traffic is sent (re-directed) to the shaper fleet at 1008. In some examples, the redirection logic 905 includes rules for which instance of the shaper fleet to use. For example, using an instance in the same availability zone, using the same instance for redirections for the same source IP, etc.

In some examples, metadata for the received traffic is recorded at 1010. In some examples, the recorded information is sent to a metrics service 151 which tracks telemetry data.

One or more traffic shaping, blocking, allowing without modification, and/or redirection operations are performed at 1014. As noted above, the operations may be traffic shaping at 1016 and/or redirection (e.g., to a honeypot) at 1018). Examples of traffic shaping operations have been detailed above.

When traffic shaping is performed, the shaped traffic is sent to a traffic resolver instance 200 for routing at 1020 in some examples. This may be the same traffic resolver instance 200 (if there is bidirectional communication) or a different traffic resolver instance 200.

The resolved traffic is sent from the traffic resolver instance 200 to the original destination at 1022. The original destination handles that traffic and, in some examples, sends traffic back to the original source (e.g., through a traffic resolver instance 200) at 1024.

In some examples, traffic is sent from the shaper instance 210 to the original destination without going to the original destination at 1025. For example, a RST may be sent from the shaper instance 210.

When redirection is performed at 1018, the unaltered traffic is sent to a traffic resolver instance 200 for routing to the new target (a redirection instance such as a honeypot) at 1026. In some examples, this may be the same traffic resolver instance 200 (if there is bidirectional communication) or a different traffic resolver instance 200.

The unaltered traffic is sent to the redirection instance at 1028 which performs one or more operation(s) and sends traffic to the source of the traffic at 1030.

Figure 11:
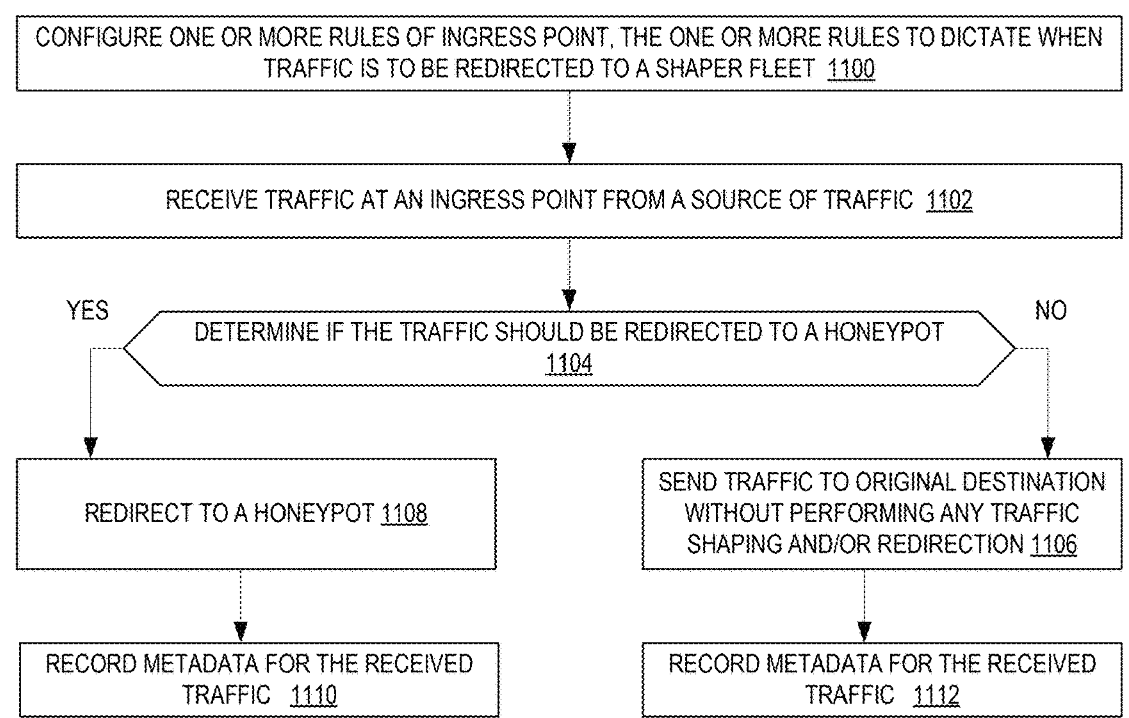
FIG. 11 is a flow diagram illustrating operations of a method for potentially shaping and/or redirecting traffic according to some examples.

FIG. 11 is a flow diagram illustrating operations of a method for potentially shaping and/or redirecting traffic according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the security infrastructure 128 and/or traffic resolving infrastructure 136 of the other figures.

Configuring one or more rules and/or information about sources at ingress point, the one or more rules to dictate when traffic is to be redirected to a shaper fleet at 1100. In some examples, the one or more rules are embodied in redirection logic 905. The application of the one or more rules may utilize source information such as the telemetry data detailed above. In some examples, the rules and/or information about sources are configured periodically. In some examples, the rules and/or information about sources are configured on an ad hoc basis. In some examples, the information about sources is sent from a metrics service 151 which tracks telemetry data.

Traffic is received at the ingress point from a source of traffic at 1102. The source may be external to a cloud provider network (and the traffic received via the internet) or the source may be a resource internal to the cloud provider network (such as a client compute resource).

The ingress point determines if the traffic should be redirected to a shaper fleet at 1104. This determination is based on one or more of the 5-tuple metadata associated with the traffic (IP addresses, ports, and protocol) and the information about sources that is available to the ingress point. In some examples, redirection logic 905 makes this determination.

The traffic is sent to the original destination without performing any traffic shaping and/or redirection at 1106 when the determination is that there should be no shaper fleet or honeypot redirection. In some examples, metadata for the received traffic is recorded at 1112. Other information may also be recorded such as when the traffic was received. In some examples, the recorded information is sent to a metrics service 151 which tracks telemetry data.

When the determination is that there should be a honeypot redirection, the traffic is sent (re-directed) to the honeypot at 1108. In some examples, the redirection logic 905 includes rules for which instance of the honeypot to use. For example, using an instance in the same availability zone, using the same instance for redirections for the same source IP, etc. In some examples, metadata for the received traffic is recorded at 1110. In some examples, the recorded information is sent to a metrics service 151 which tracks telemetry data.

Figure 12:
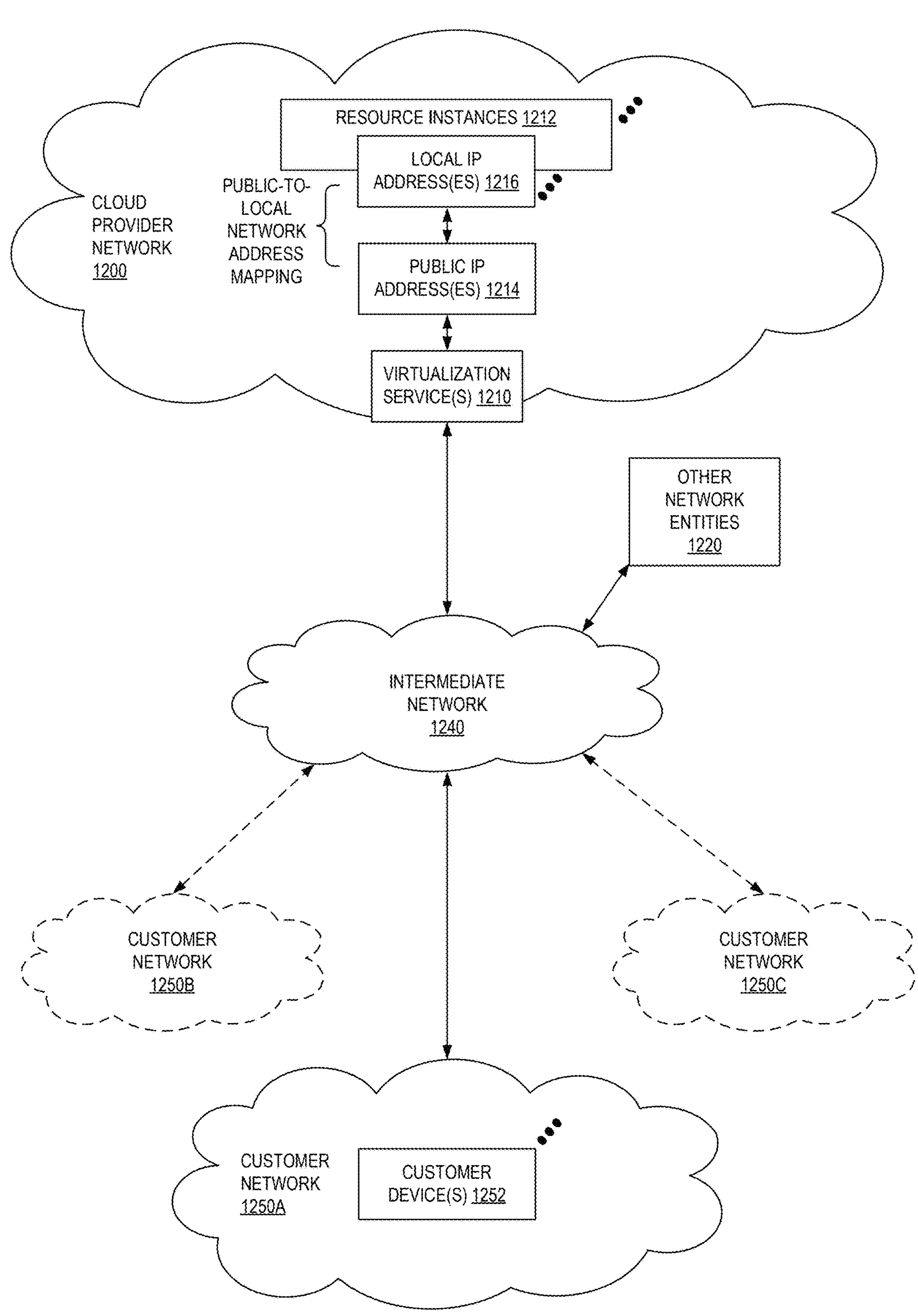
FIG. 12 illustrates an example cloud provider network environment according to some examples.

FIG. 12 illustrates an example provider network (or "service provider system") environment according to some examples. A provider network 1200 can provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 can be associated with the resource instances 1212; the local IP addresses are the internal network addresses of the resource instances 1212 on the provider network 1200. In some examples, the provider network 1200 can also provide public IP addresses 1214 and/or public IP address ranges (e.g., Internet Protocol version 4 (IPv4) or Internet Protocol version 6 (IPv6) addresses) that customers can obtain from the provider 1200.

Conventionally, the provider network 1200, via the virtualization services 1210, can allow a customer of the service provider (e.g., a customer that operates one or more customer networks 1250A-1250C (or "client networks") including one or more customer device(s) 1252) to dynamically associate at least some public IP addresses 1214 assigned or allocated to the customer with particular resource instances 1212 assigned to the customer. The provider network 1200 can also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of the customer network(s) 1250A-1250C can, for example, implement customer-specific applications and present the customer's applications on an intermediate network 1240, such as the Internet. Other network entities 1220 on the intermediate network 1240 can then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 can be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1200; a customer can then assign their allocated public IP addresses to particular resource instances allocated to the customer. These public IP addresses can be referred to as customer public IP addresses, or simply customer IP addresses. Instead of being assigned by the provider network 1200 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
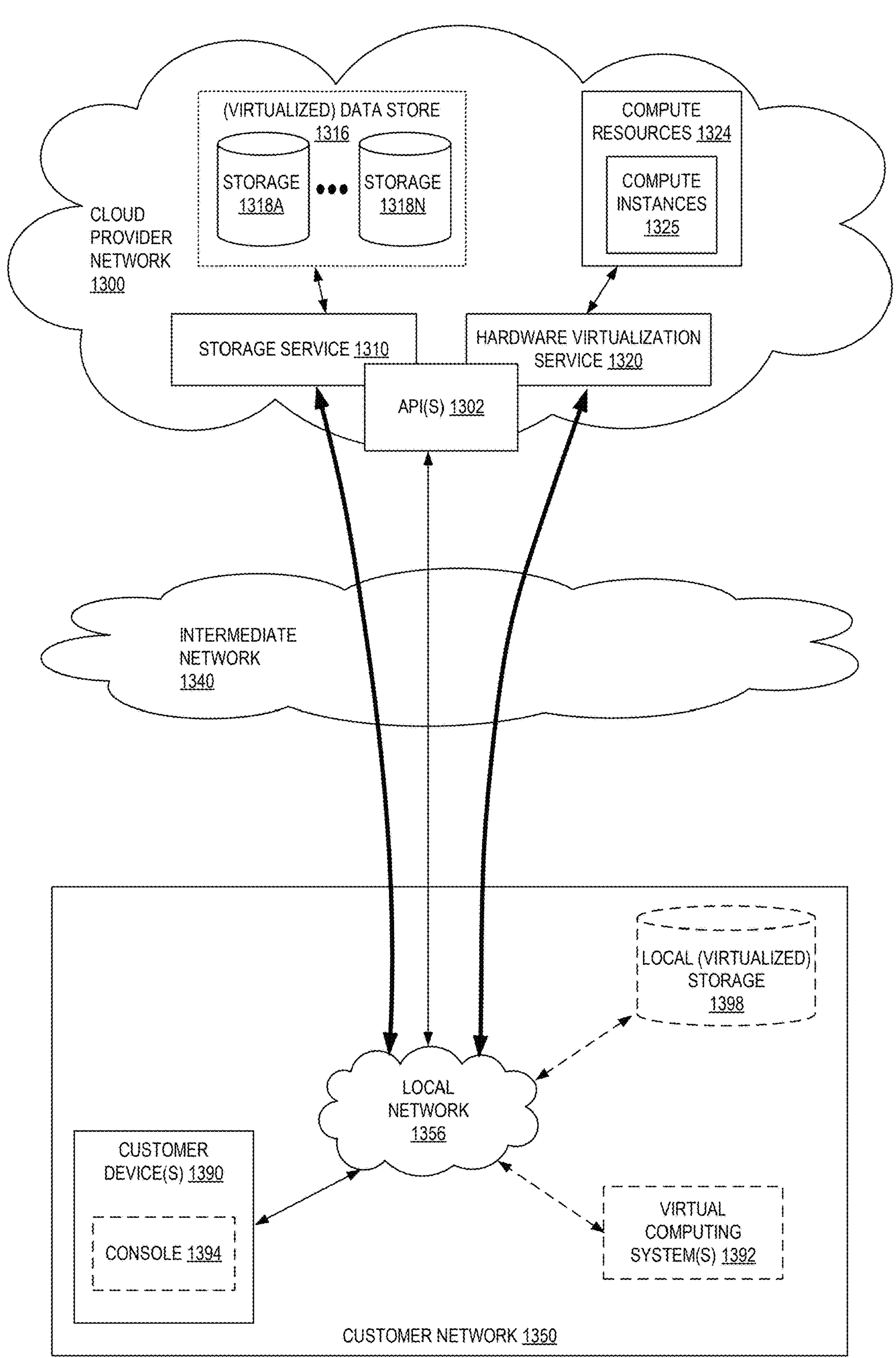
FIG. 13 is a block diagram of an example cloud provider network that provides a storage service and a hardware virtualization service to users according to some examples.

FIG. 13 is a block diagram of an example provider network environment that provides a storage service and a hardware virtualization service to users, according to some examples. A hardware virtualization service 1320 provides multiple compute resources 1324 (e.g., compute instances 1325, such as VMs) to users. The compute resources 1324 can, for example, be provided as a service to users (or "customers") of a provider network 1300 (e.g., to a customer that implements a customer network 1350). Each computation resource 1324 can be provided with one or more local IP addresses. The provider network 1300 can be configured to route packets from the local IP addresses of the compute resources 1324 to public Internet destinations, and from public Internet sources to the local IP addresses of the compute resources 1324.

The provider network 1300 can provide the customer network 1350, for example coupled to an intermediate network 1340 via a local network 1356, the ability to implement virtual computing systems 1392 via the hardware virtualization service 1320 coupled to the intermediate network 1340 and to the provider network 1300. In some examples, the hardware virtualization service 1320 can provide one or more APIs 1302, for example a web services interface, via which the customer network 1350 can access functionality provided by the hardware virtualization service 1320, for example via a console 1394 (e.g., a web-based application, standalone application, mobile application, etc.) of a customer device 1390. In some examples, at the provider network 1300, each virtual computing system 1392 at the customer network 1350 can correspond to a computation resource 1324 that is leased, rented, or otherwise provided to the customer network 1350.

From an instance of the virtual computing system(s) 1392 and/or another customer device 1390 (e.g., via console 1394), the customer can access the functionality of a storage service 1310, for example via the one or more APIs 1302, to access data from and store data to storage resources 1318A-1318N of a virtual data store 1316 (e.g., a folder or "bucket," a virtualized volume, a database, etc.) provided by the provider network 1300. In some examples, a virtualized data store gateway (not shown) can be provided at the customer network 1350 that can locally cache at least some data, for example frequently accessed or critical data, and that can communicate with the storage service 1310 via one or more communications channels to upload new or modified data from a local cache so that the primary store of data (the virtualized data store 1316) is maintained. In some examples, a user, via the virtual computing system 1392 and/or another customer device 1390, can mount and access virtual data store 1316 volumes via the storage service 1310 acting as a storage virtualization service, and these volumes can appear to the user as local (virtualized) storage 1398.

While not shown in FIG. 13, the virtualization service(s) can also be accessed from resource instances within the provider network 1300 via the API(s) 1302. For example, a customer, appliance service provider, or other entity can access a virtualization service from within a respective virtual network on the provider network 1300 via the API(s) 1302 to request allocation of one or more resource instances within the virtual network or within another virtual network.

Illustrative Systems

Figure 14:
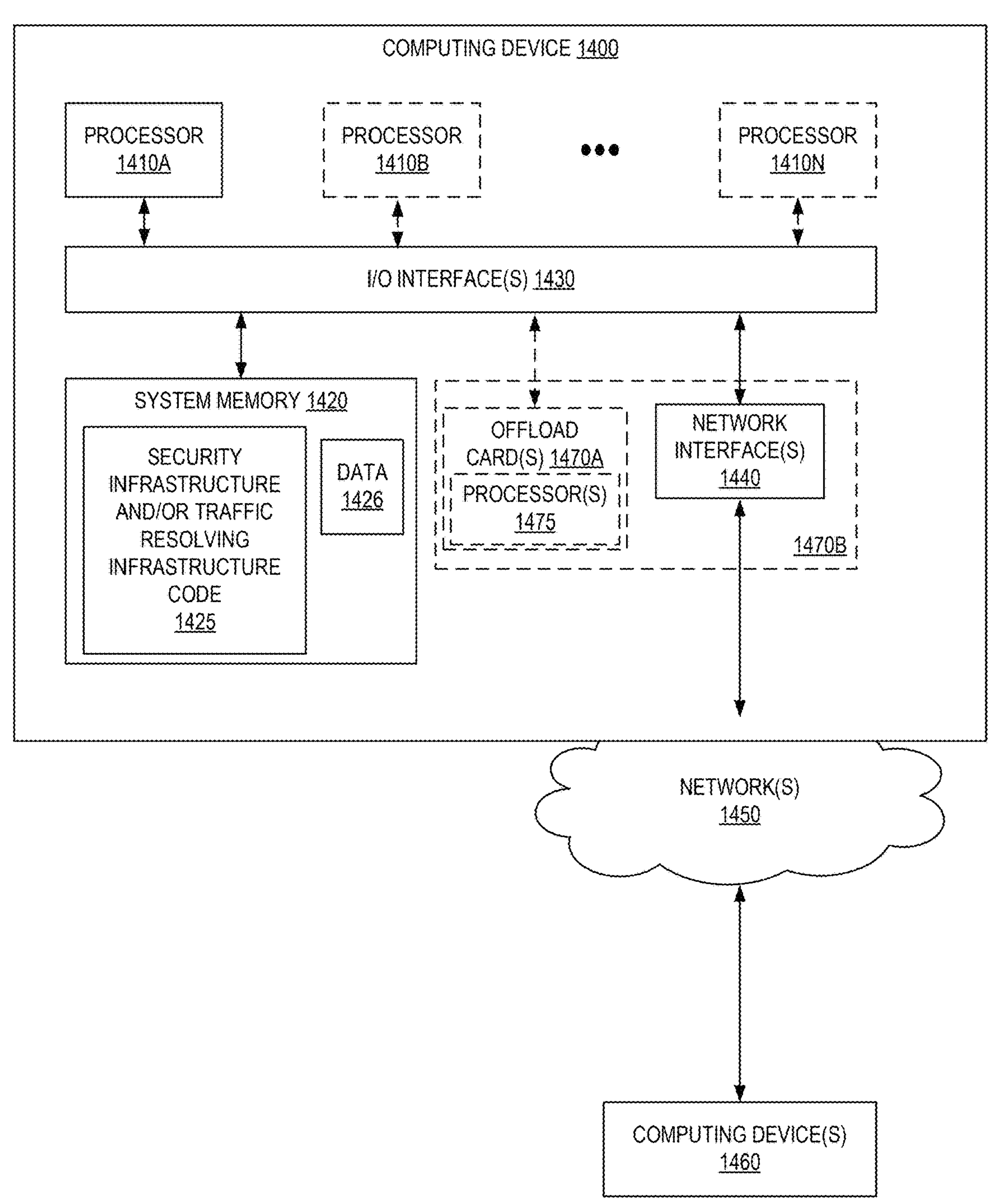
FIG. 14 is a block diagram illustrating an example computing device that can be used in some examples.

In some examples, a system that implements a portion or all of the techniques described herein can include a general-purpose computer system, such as the computing device 1400 (also referred to as a computing system or electronic device) illustrated in FIG. 14, that includes, or is configured to access, one or more computer-accessible media. In the illustrated example, the computing device 1400 includes one or more processors 1410 coupled to a system memory 1420 via an input/output (I/O) interface 1430. The computing device 1400 further includes a network interface 1440 coupled to the I/O interface 1430. While FIG. 14 shows the computing device 1400 as a single computing device, in various examples the computing device 1400 can include one computing device or any number of computing devices configured to work together as a single computing device 1400.

In various examples, the computing device 1400 can be a uniprocessor system including one processor 1410, or a multiprocessor system including several processors 1410 (e.g., two, four, eight, or another suitable number). The processor(s) 1410 can be any suitable processor(s) capable of executing instructions. For example, in various examples, the processor(s) 1410 can be general-purpose or embedded processors implementing any of a variety of instruction set architectures (ISAs), such as the ×86, ARM, PowerPC, SPARC, or MIPS ISAs, or any other suitable ISA. In multiprocessor systems, each of the processors 1410 can commonly, but not necessarily, implement the same ISA.

The system memory 1420 can store instructions and data accessible by the processor(s) 1410. In various examples, the system memory 1420 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1420 as security infrastructure and/or traffic resolving infrastructure code 1425 (e.g., executable to implement, in whole or in part, the security infrastructure 128 and/or traffic resolving infrastructure 136) and data 1426.

In some examples, the I/O interface 1430 can be configured to coordinate I/O traffic between the processor 1410, the system memory 1420, and any peripheral devices in the device, including the network interface 1440 and/or other peripheral interfaces (not shown). In some examples, the I/O interface 1430 can perform any necessary protocol, timing, or other data transformations to convert data signals from one component (e.g., the system memory 1420) into a format suitable for use by another component (e.g., the processor 1410). In some examples, the I/O interface 1430 can include support for devices attached through various types of peripheral buses, such as a variant of the Peripheral Component Interconnect (PCI) bus standard or the Universal Serial Bus (USB) standard, for example. In some examples, the function of the I/O interface 1430 can be split into two or more separate components, such as a north bridge and a south bridge, for example. Also, in some examples, some or all of the functionality of the I/O interface 1430, such as an interface to the system memory 1420, can be incorporated directly into the processor 1410.

The network interface 1440 can be configured to allow data to be exchanged between the computing device 1400 and other computing devices 1460 attached to a network or networks 1450, such as other computer systems or devices as illustrated in FIG. 1, for example. In various examples, the network interface 1440 can support communication via any suitable wired or wireless general data networks, such as types of Ethernet network, for example. Additionally, the network interface 1440 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1400 includes one or more offload cards 1470A or 1470B (including one or more processors 1475, and possibly including the one or more network interfaces 1440) that are connected using the I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1400 can act as a host electronic device (e.g., operating as part of a hardware virtualization service) that hosts compute resources such as compute instances, and the one or more offload cards 1470A or 1470B execute a virtualization manager that can manage compute instances that execute on the host electronic device. As an example, in some examples the offload card(s) 1470A or 1470B can perform compute instance management operations, such as pausing and/or un-pausing compute instances, launching and/or terminating compute instances, performing memory transfer/copying operations, etc. These management operations can, in some examples, be performed by the offload card(s) 1470A or 1470B in coordination with a hypervisor (e.g., upon a request from a hypervisor) that is executed by the other processors 1410A-1410N of the computing device 1400. However, in some examples the virtualization manager implemented by the offload card(s) 1470A or 1470B can accommodate requests from other entities (e.g., from compute instances themselves), and cannot coordinate with (or service) any separate hypervisor.

In some examples, the system memory 1420 can be one example of a computer-accessible medium configured to store program instructions and data as described above. However, in other examples, program instructions and/or data can be received, sent, or stored upon different types of computer-accessible media. Generally, a computer-accessible medium can include any non-transitory storage media or memory media such as magnetic or optical media, e.g., disk or DVD/CD coupled to the computing device 1400 via the I/O interface 1430. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1400 as the system memory 1420 or another type of memory. Further, a computer-accessible medium can include transmission media or signals such as electrical, electromagnetic, or digital signals, conveyed via a communication medium such as a network and/or a wireless link, such as can be implemented via the network interface 1440.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1318A-1318N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C, where the second processor could be part of same computing device as the first processor or part of a separate computing device as the first processor.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second,"

"third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

configuring one or more rules at a traffic resolver instance, the one or more rules to dictate when traffic received at the traffic resolver instance is to be redirected to a shaper instance;

receiving traffic at the traffic resolver instance from a source of traffic;

determining, at the traffic resolver instance from packet metadata and telemetry data of the traffic, the traffic should be redirected to the shaper instance, the shaper instance capable of performing one or more of a plurality of actions, wherein the plurality of actions include altering a shape of the traffic prior to sending the traffic to an original destination of the traffic, allowing the traffic without doing altering action, redirecting the traffic to a honeypot, and blocking the traffic;

resolving, by the traffic resolver instance, addressing of the traffic such that a new destination for the traffic is the shaper instance;

sending, by the traffic resolver instance, the traffic to the shaper instance;

altering, by the shaper instance, a shape of the traffic, wherein altering the shape of the traffic does not alter a payload of the traffic;

sending the traffic to the original destination of the traffic; and sending a response from the original destination of the traffic to the source of the traffic.

2. The computer-implemented method of claim 1, wherein the source of traffic is external to a cloud provider network.

3. The computer-implemented method of claim 1, wherein altering a shape of the traffic prior to sending the traffic to the original destination of the traffic comprises selectively dropping an amount of individual packets of a traffic along a path to the original destination.

4. A computer-implemented method comprising:

configuring one or more rules at a traffic resolver instance, the one or more rules to dictate when traffic received at the traffic resolver instance is to be redirected to a shaper instance, the shaper instance capable of performing one or more of a plurality of actions, wherein the plurality of actions include altering a shape of the traffic prior to sending the traffic to an original destination of the traffic, redirecting the traffic to a honeypot, allowing the traffic without doing altering action, or blocking the traffic;

receiving traffic at the traffic resolver instance from a source of traffic;

determining, at the traffic resolver instance from packet metadata and telemetry data of the traffic, the traffic should be redirected to the shaper instance;

resolving, by the traffic resolver instance, addressing of the traffic such that a new destination for the traffic is the shaper instance;

sending, by the traffic resolver instance, the traffic to the shaper instance; and performing, by the shaper instance, one or more of the plurality of actions on the traffic.

5. The computer-implemented method of claim 4, wherein altering a shape of the traffic prior to sending the traffic to the original destination of the traffic comprises selectively dropping an amount of individual packets of the traffic along a path to the original destination.

6. The computer-implemented method of claim 4, wherein altering a shape of the traffic prior to sending the traffic to the original destination of the traffic comprises selectively dropping acknowledgement packets in a transmission control packet header of the traffic.

7. The computer-implemented method of claim 4, wherein altering a shape of the traffic prior to sending the traffic to the original destination of the traffic comprises using a variable maximum segment size in a transmission control packet header of the traffic.

8. The computer-implemented method of claim 4, wherein altering a shape of the traffic prior to sending the traffic to the original destination of the traffic comprises sending false reset (RST) packets to the source of the traffic.

9. The computer-implemented method of claim 4, wherein altering a shape of the traffic prior to sending the traffic to the original destination of the traffic comprises invalidating a payload of a proper subset of individual packets from the traffic.

10. The computer-implemented method of claim 4, wherein altering a shape of the traffic prior to sending the traffic to the original destination of the traffic comprises sending invalided transmission control packet header checksums.

11. The computer-implemented method of claim 4, wherein altering a shape of the traffic prior to sending the traffic to the original destination of the traffic comprises altering transmission control packet header fields.

12. The computer-implemented method of claim 4, wherein determining the traffic should be redirected to the shaper instance comprises analyzing one or more of a source internet protocol (IP) address, a destination IP address, a source port, a destination port, and a protocol of the traffic in view of existing telemetry data for the source IP address.

13. The computer-implemented method of claim 4, wherein the source of traffic is external to a cloud provider network.

14. The computer-implemented method of claim 4, wherein the traffic resolver instance is a first traffic resolver instance, the method further comprising, after the shaper instance has performed the one or more of the plurality of actions on the traffic, sending, by the shaper instance, the traffic to a second traffic resolver instance that is different from the first traffic resolver instance.

15. A system comprising:

a first one or more computing devices to implement a traffic resolver instance in the multi-tenant provider network, the traffic resolver instance including instructions that upon execution cause the traffic resolver instance to:

receive traffic from a source of traffic, wherein the ingress point traffic resolver instance is to be configured with one or more rules that dictate when traffic received at the traffic resolver instance is to be redirected to a shaper instance, the shaper instance capable of performing one or more of a plurality of actions, wherein the plurality of actions include to alter a shape of the traffic prior to sending the traffic to an original destination of the traffic, to redirect the traffic to a honeypot, to allow the traffic without doing altering action, and to block the traffic, and determine, from packet metadata and telemetry data of the traffic, the traffic should be redirected to the shaper instance;

resolve addressing of the traffic such that a new destination for the traffic is the shaper instance;

send the traffic to the shaper instance; and a second one or more computing devices to implement the shaper instance in the multi-tenant provider network, the shaper instance including instructions that upon execution cause the shaper instance to at least perform one more of one or more of the plurality of actions on the traffic.

16. The system of claim 15, wherein to alter a shape of the traffic prior to sending the traffic to the original destination of the traffic comprises to selectively drop an amount of individual packets of the traffic along a path to the original destination.

17. The system of claim 15, wherein to alter a shape of the traffic prior to sending the traffic to the original destination of the traffic comprises to selectively drop acknowledgement packets in a transmission control packet header of the traffic.

18. The system of claim 15, wherein to alter a shape of the traffic prior to sending the traffic to the original destination of the traffic comprises to use a variable maximum segment size in a transmission control packet header of the traffic.

19. The system of claim 15, wherein to alter a shape of the traffic prior to sending the traffic to the original destination of the traffic comprises to send false reset (RST) packets to the source of the traffic.

20. The system of claim 15, wherein to alter a shape of the traffic prior to sending the traffic to the original destination of the traffic comprises to invalidate a payload of a proper subset of individual packets from the traffic.

* * * * *